(12) United States Patent
Lee

(10) Patent No.: US 7,940,809 B2
(45) Date of Patent: May 10, 2011

(54) DIGITAL VIDEO INTERFACE WITH BI-DIRECTIONAL HALF-DUPLEX CLOCK CHANNEL USED AS AUXILIARY DATA CHANNEL

(75) Inventor: Bong-Joon Lee, Seoul (KR)

(73) Assignee: Synerchip Co. Ltd., Hsinchu (TW)

( * ) Notice: Subject to any disclaimer, the term of this patent is extended or adjusted under 35 U.S.C. 154(b) by 405 days.

(21) Appl. No.: 11/760,164

(22) Filed: Jun. 8, 2007

(65) Prior Publication Data

US 2008/0247341 A1  Oct. 9, 2008

Related U.S. Application Data

(60) Provisional application No. 60/910,759, filed on Apr. 9, 2007.

(51) Int. Cl.
*H04J 3/12* (2006.01)

(52) U.S. Cl. ............................................. 370/525

(58) Field of Classification Search ................. None
See application file for complete search history.

(56) References Cited

U.S. PATENT DOCUMENTS

| | | | | |
|---|---|---|---|---|
| 6,507,592 B1 * | 1/2003 | Hurvig et al. | ................. | 370/503 |
| 7,295,578 B1 * | 11/2007 | Lyle et al. | ..................... | 370/503 |
| 2001/0024430 A1 * | 9/2001 | Sekine et al. | .................. | 370/331 |
| 2002/0181608 A1 * | 12/2002 | Kim et al. | ..................... | 375/295 |
| 2004/0001447 A1 * | 1/2004 | Schafer | ........................ | 370/280 |
| 2004/0264482 A1 * | 12/2004 | Kang et al. | .................... | 370/401 |
| 2008/0112371 A1 * | 5/2008 | Joshi et al. | .................... | 370/337 |

OTHER PUBLICATIONS

"Digital Visual Interface, DVI: Revision 1.0," Apr. 2, 1999, Digital Display Working Group, pp. 1-76.
"High-Definition Multimedia Interface: Specification Version 1.2a," Dec. 14, 2005, pp. 1-193, HDMI Licensing, LLC.
"High-Definition Multimedia Interface: Specification Version 1.3a," Nov. 10, 2006, pp. 1-276, HDMI Licensing, LLC.
"Unified Display Interface (UDI) Specification: Revision 1.0a Final," Jul. 12, 2006, pp. 1-185.

* cited by examiner

*Primary Examiner* — Chi H Pham
*Assistant Examiner* — Fan Ng
(74) *Attorney, Agent, or Firm* — Elizabeth Kim

(57) ABSTRACT

A digital video interface system and method for communicating digital video data from a source device to a sink device is provided, where the clock channel is used to transmit data as well as clock signals in a bi-directional, half-duplex manner using time division multiplexing. The digital video interface system comprises one or more data channels configured to transmit digital video data from the source device to the sink device in time divisional multiplexing including a plurality of first time slots and second time slots, and a clock channel configured to transmit a clock signal from the source device to the sink device in the first time slots and configured to transmit additional data from the source device to the sink device or from the sink device to the source device in the second time slots.

32 Claims, 4 Drawing Sheets

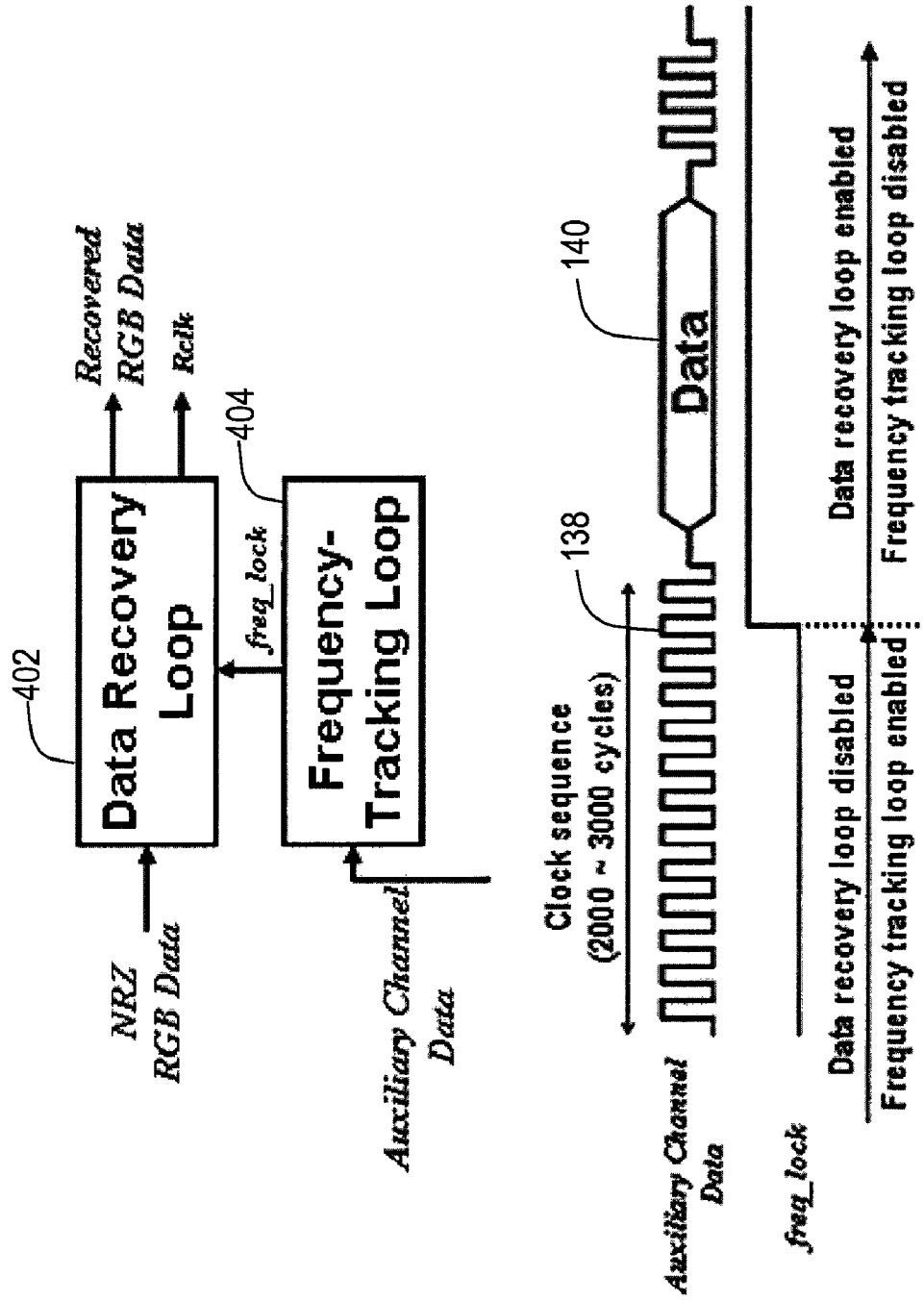

DIGITAL VIDEO INTERFACE WITH BI-DIRECTIONAL HALF-DUPLEX CLOCK CHANNEL USED AS AUXILIARY DATA CHANNEL

CROSS-REFERENCE TO RELATED APPLICATION

This application claims priority under 35 U.S.C. §119(e) from co-pending U.S. Provisional Patent Application No. 60/910,759, entitled "Digital Video Interface with Bi-Directional Half-Duplex Auxiliary Data Channel," filed on Apr. 9, 2007, which is incorporated by reference herein in its entirety.

BACKGROUND OF THE INVENTION

1. Field of the Invention

The present invention relates to a digital video interface and, more specifically, to a digital video interface that uses the clock channel as an auxiliary data channel.

2. Description of the Related Art

Current digital video interfaces such as DVI (Digital Video Interface), HDMI (High-Definition Multimedia Interface), and UDI (Unified Display Interface) typically use 3 or 6 RGB (Red, Green, and Blue video data) channels for the main data stream and 1 clock channel for a frequency reference, in order to transmit digital video data between a video source device (e.g., a digital video disk player) and a video sink device (e.g., a high-definition television). Each channel (R, G, B, and clock) is typically comprised of a differential pair of two matched wires. The clock channel is used to transmit the frequency reference for the digital video data from the video source device to the video sink device, with the clock frequency being set to the video data rate of the digital video data.

In conventional digital video interfaces such as HDMI, the R, G, B data channels transmit video data and control data in an alternating manner with time-division multiplexing. That is, video data is transmitted in certain time slots of the R, G, B data channels while control data is transmitted in other time slots of the R, G, B data channels in an alternating manner. The clock signal is transmitted via the clock channel continuously regardless of whether the R, G, B data channels are used to transmit digital video data or control data.

However, once the RGB links become settled, the frequency information is no longer needed by the video sink side, because the receiver clock and data recovery circuit in the digital video interfaces can keep the link synchronized using the serial RGB data. Thus, conventional digital video interfaces use the clock channel inefficiently, transmitting the clock signal continuously even when the frequency information may not be needed at the video sink. This results in inefficient use of the clock channel.

Thus, there is a need for a technique for using the clock channel of a digital video interface more efficiently.

SUMMARY OF THE INVENTION

Embodiments of the present invention include a digital video interface system and method for communicating digital video data from a source device to a sink device, where the clock channel is used as an auxiliary data channel to transmit data as well as clock signals in a bi-directional, half-duplex manner using time division multiplexing. In one embodiment, the digital video interface system comprises one or more data channels configured to transmit digital video data from the source device to the sink device, where the data channels are configured to operate in time divisional multiplexing with a plurality of first time slots and second time slots, and a clock channel configured to transmit a clock signal from the source device to the sink device in the first time slots and configured to transmit additional data from the source device to the sink device in the second time slots. The clock channel may also be configured to transmit the additional data in the opposite direction from the sink device to the source device in the second time slots.

The digital video data are transmitted from the source device to the sink device via the data channels in the second time slots, while control data corresponding to the digital video data are transmitted from the source device to the sink device via the data channels in the first time slots. In addition, additional control data may be transmitted from the source device to the sink device via the clock channel in the first time slots.

In one embodiment, the clock channel is configured to operate in one of a plurality of operation modes. In a first mode, the clock signal is transmitted from the source device to the sink device via the clock channel in the first time slots. In a second mode, the additional data are transmitted from the source device to the sink device via the clock channel in the second time slots. In a third mode, the additional data are transmitted from the sink device to the source device via the clock channel in the second time slots.

Accordingly, the digital video interface system further comprises a source side transmitter configured to transmit the clock signal in the first mode or the additional data in the second mode to the sink device via the clock channel, a sink side receiver configured to receive the clock signal in the first mode or the additional data in the second mode from the source device via the clock channel, a sink side transmitter configured to transmit the additional data in the third mode to the source device via the clock channel, and a source side receiver configured to receive the additional data in the third mode from the sink device via the clock channel. The sink side transmitter is disabled in the first mode and the second mode, and the source side transmitter is disabled in the third mode.

In one embodiment, the additional data transmitted via the clock channel from the source device to the sink device includes a control packet indicating whether subsequent payload data to be transmitted via the clock channel is in a first direction from the source device to the sink device or in a second direction from the sink device to the source device.

The digital video interface system of the present invention enables a bi-directional, half-duplex, auxiliary data channel using the clock channel of the digital video interface, yet neither changing the channel composition nor sacrificing the performance of the data channels of the digital video interface. Thus, the clock channel is more efficiently used, and more data can be communicated between the source device and the sink device without making any significant changes to the channel composition of the digital video interfaces.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. 4 illustrates the operation of the clock data recovery (CDR) circuits of the RGB channels, according to one embodiment of the present invention.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
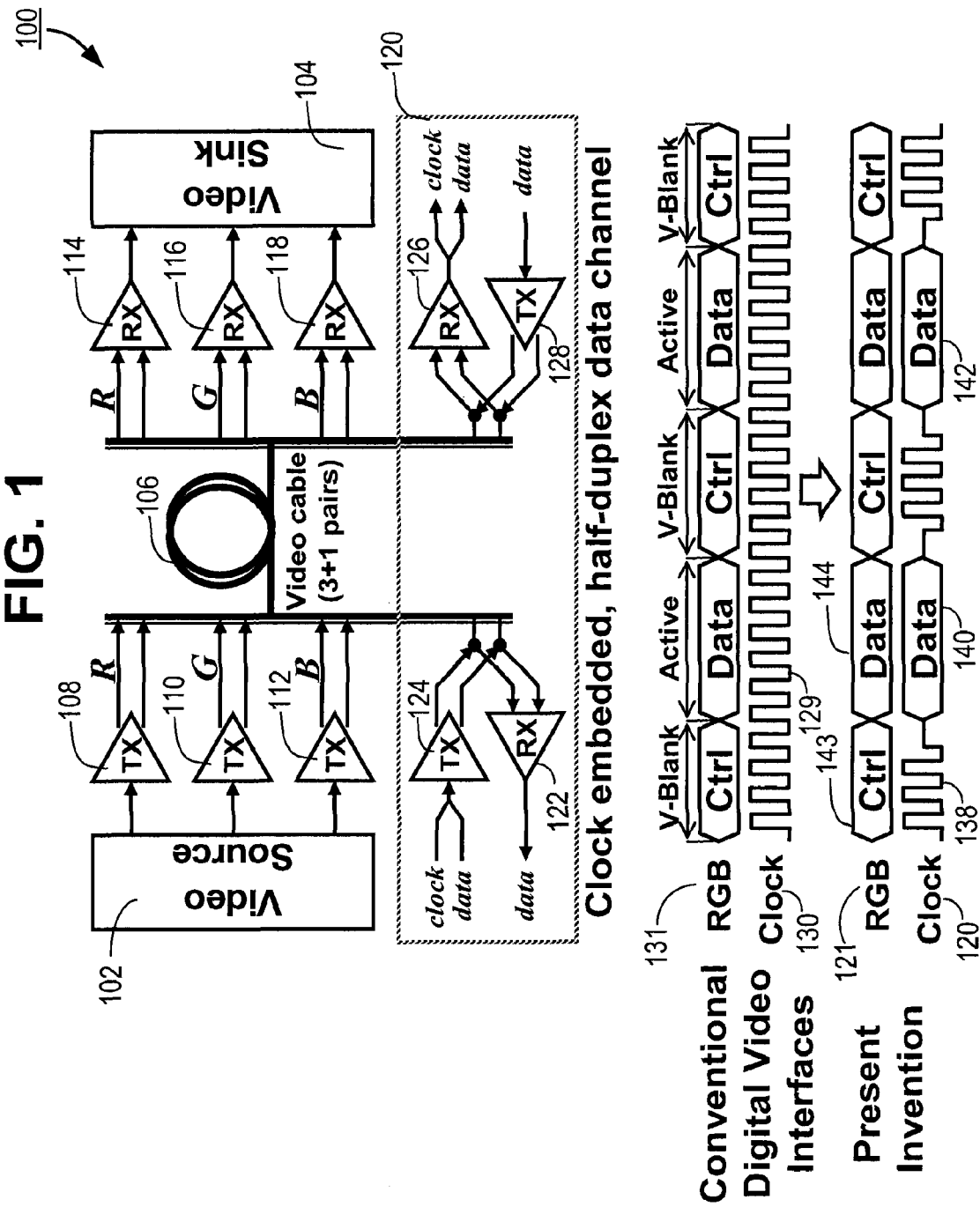
FIG. 1 is a conceptual block diagram illustrating the bi-directional half-duplex auxiliary data channel using the clock channel of the digital video interface, according to one embodiment of the present invention.

FIG. 1 is a conceptual block diagram illustrating the bi-directional half-duplex auxiliary data channel using the clock channel of the digital video interface 100, according to one embodiment of the present invention. The digital video interface 100 transmits digital video data, control data, and clock signals from the video source device 102 to the video sink device 104. The digital video interface 100 includes transmitters (TX) 108, 110, 112 for transmitting R, G, B digital video data, respectively, from the video source 102 over the video cables 106 to the video sink device 104. The digital video interface 100 also includes receivers (RX) 114, 116, 118 for receiving the R, G, B digital video data, respectively, over video cables 106 at the video sink 104. The R, G, B channels are unidirectional from the video source 102 to the video sink 104. The video cables 106 include 4 differential pairs (3+1) of 2 wires, with each of the 4 pairs corresponding to the R, G, B, and clock channels, respectively.

The digital video interface 100 also includes a clock channel 120. The clock channel 120 includes a transmitter 124 for transmitting clock and data from the video source 102 to the video sink 104 via the video cable 106 and a receiver 126 for receiving the clock and data from the video source 102 at the video sink 104 via the video cable 106. Thus, unlike the clock channel of conventional digital video interfaces, the clock channel 120 of the digital video interface 120 of the present invention is used to transmit both clock and data. The clock channel 120 also includes a transmitter 128 for transmitting data from the video sink 104 to the video source 102 via the video cable 106 and a receiver 122 for receiving the data from the video sink 104 at the video source 102 via the video cable 106. Thus, unlike the clock channel of conventional digital video interfaces, the clock channel 120 of the digital video interface 120 of the present invention is bi-directional and can be used to transmit data in both directions between the video source 102 and the video sink 104.

As shown in FIG. 1, the conventional digital video interface protocol consists of repetitive 'V-blank' (Vertical Blank) and 'active' sequences (or time slots) alternating in a time-divisional multiplexing (TDM) manner. The RGB channels 131 transmit control signals (Ctrl) during the V-blank sequences and video data (Data) during the active sequences in an alternating manner. The clock channel 130 of the conventional digital video interface continuously transmits the clock signal 129 regardless of whether the RGB channels are in the V-blank sequences or in the active sequences.

In contrast, the clock channel 120 of the present invention is configured to transmit data (in addition to the RGB data transmitted via the RGB channel) as well as clock signals. The clock channel 120 of the present invention applies time-division multiplexing (TDM) to the clock channel to enhance the clock channel utility. The clock channel 120 is configured to transmit clock signals and additional control signals (e.g., frame headers, control packets, etc.) 138 while the RGB channel 119 transmits control data (Ctrl) 143 during the V-blank sequences, and transmits data signals (Data) 140, 142 while the RGB channel 119 transmits video data (Data) 144 during the active sequences. The TDM of the clock channel 120 is synchronized to the sequences (video channel periods) of the RGB channels 121.

The data 140, 142 may be, for example, audio data or other types of data. The clock channel 120 transmits data signals 140, 142 bidirectionally. For example, the data 140 is transmitted in the direction from the video source 102 to the video sink 104 via the clock channel 120, and the data 142 is transmitted in the direction from the video sink 104 to the video source 102 via the clock channel 120. Thus, an auxiliary data channel in addition to the RGB channels 121 is enabled by the clock channel 120. The clock channel 120 is bi-directional but half-duplex in the sense that data 140 and 142 are in different directions but that data can be transmitted only uni-directionally at a time in each sequence. Thus, the clock channel 120 does not transmit data in both directions at the same time. By adopting a half-duplex protocol, the auxiliary data channel can be easily transformed to a bi-directional link, providing great flexibility in dynamic allocation of bandwidth, compared to the conventional digital video interfaces.

Figure 2:
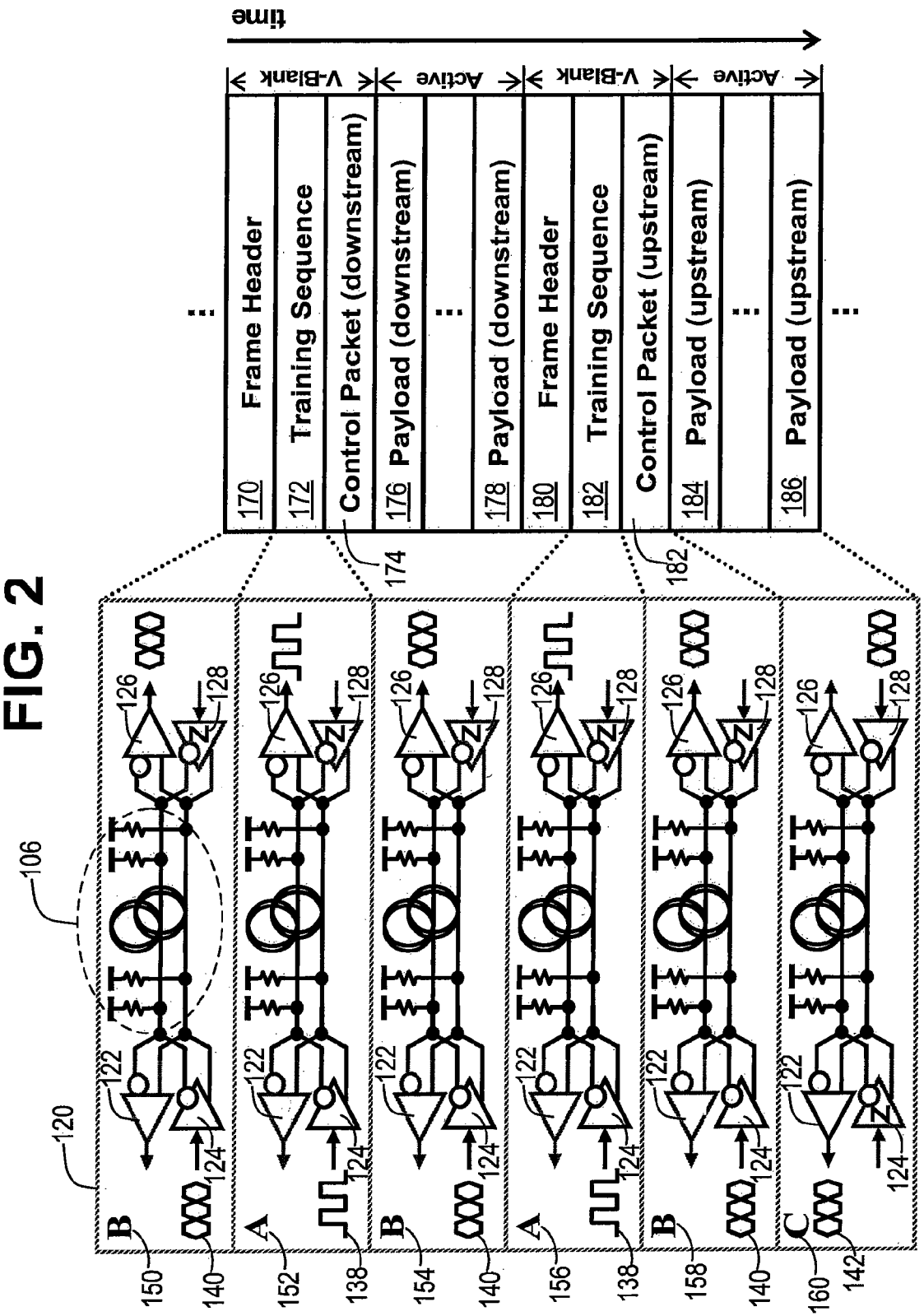
FIG. 2 illustrates a half-duplex link protocol and the transceiver configurations at each TDM (time-division multiplexing) step for implementing the auxiliary channel using the clock channel of the digital video interface, according to one embodiment of the present invention.

FIG. 2 illustrates a half-duplex link protocol and the transceiver configurations at each TDM step for implementing the auxiliary channel over the clock channel of the digital video interface, according to one embodiment of the present invention. The clock-embedded, half-duplex data channel implemented over the clock channel 120 is comprised of transceiver cores in each video source/sink sides and a TDM protocol to control them.

As shown in FIG. 2, the clock channel 120 and transceiver pairs have 3 operation modes—A, B, and C. In mode A, the clock pattern 138 is transmitted from the video source 102 to the video sink 104 via the clock channel 120 during V-blank sequences (time slots) of the RGB channels 121. In mode B, data 140 (NRZ (Non-Return to Zero) data) is transmitted from the video source 102 to the video sink 104 via the clock channel 120 during active sequences (time slots) of the RGB channels 121. In mode C, data 142 (NRZ pattern) is transmitted in the opposite direction from the video sink 104 to the video source 102 via the clock channel during V-blank sequences of the RGB channels 121. Therefore, in modes A and B, the source receiver 122 and the sink transmitter 128 are disabled (as illustrated by the high impedance notation Z in the sink transmitter 128). In mode C, the source transmitter 124 and the sink receiver 126 are disabled (as illustrated by the high impedance notation Z in the source transmitter 124).

Referring to the example sequence of modes as shown in FIG. 2, in mode B 150, the data 140 (the frame header 170) is transmitted from the video source 102 to the video sink 104 during the V-blank time slot via the clock channel 120 using the transmitter 124 and the receiver 126. In mode A 152, the clock signal 138 (which is the training sequence 172) is transmitted from the video source 102 to the video sink 104 during the V-blank time slot via the clock channel 120 using the transmitter 124 and the receiver 126. The clock sequence 138 is used as a frequency reference for main RGB data channels while subsequent control packet sets up a link protocol for the auxiliary data channel. In mode B 154, data 140 which is a control packet 174 is transmitted from the video source 102 to the video sink 104 during the V-blank time slot via the clock channel 120 using the transmitter 124 and the receiver 126. The control packet 174 indicates whether the next data stream is upward (from sink to source) or downward (from source to sink), and the subsequent data stream is transferred accordingly during the active period. For example, the control packet 174 indicates downstream traffic. In addition, the control packet 174 may contains training sequences which help the auxiliary channel transmitter/receiver switch their operation mode smoothly.

Still in mode B 154, data 140 which is payload data 176, 178 are transmitted from the video source 102 to the video sink 104 during the active time slot via the clock channel 120 using the transmitter 124 and the receiver 126. Additionally in mode B 154, data 140 which is a frame header 180 is also transmitted from the video source 102 to the video sink 104 during a V-blank time slot via the clock channel 120 using the transmitter 124 and the receiver 126. Next, in mode A 156, another clock signal 138 (training sequence 182) is transmitted from the video source 102 to the video sink 104 during the V-blank time slot via the clock channel 120 using the transmitter 124 and the receiver 126. In mode B 158, data 140 (control packet 182) is transmitted from the video source 102 to the video sink 104 via the clock channel 120 during the V-blank time slot using the transmitter 124 and the receiver 126. This time, the control packet 182 indicates that the subsequent data stream will be transferred in the opposite direction from the video sink 104 to the video source 102. Thus, in mode C 160, data 142 (payload data 184, 186) is transmitted from the video sink 104 to the video source 102 during the active time slot via the clock channel 120 using the transmitter 128 and the receiver 122.

The auxiliary data channel using the clock channel 120 of the present invention has an aggregate bandwidth comparable to one of the main stream channels (R, G, or B). The source device can control the bandwidth allocation between upstream traffic and downstream traffic between the video source 102 and the video sink 104. Through a dynamic bandwidth allocation, the auxiliary channel can be either dedicated to uni-directional communication or shared by the upward or downward data streams, maximizing bandwidth efficiency.

Figure 3:
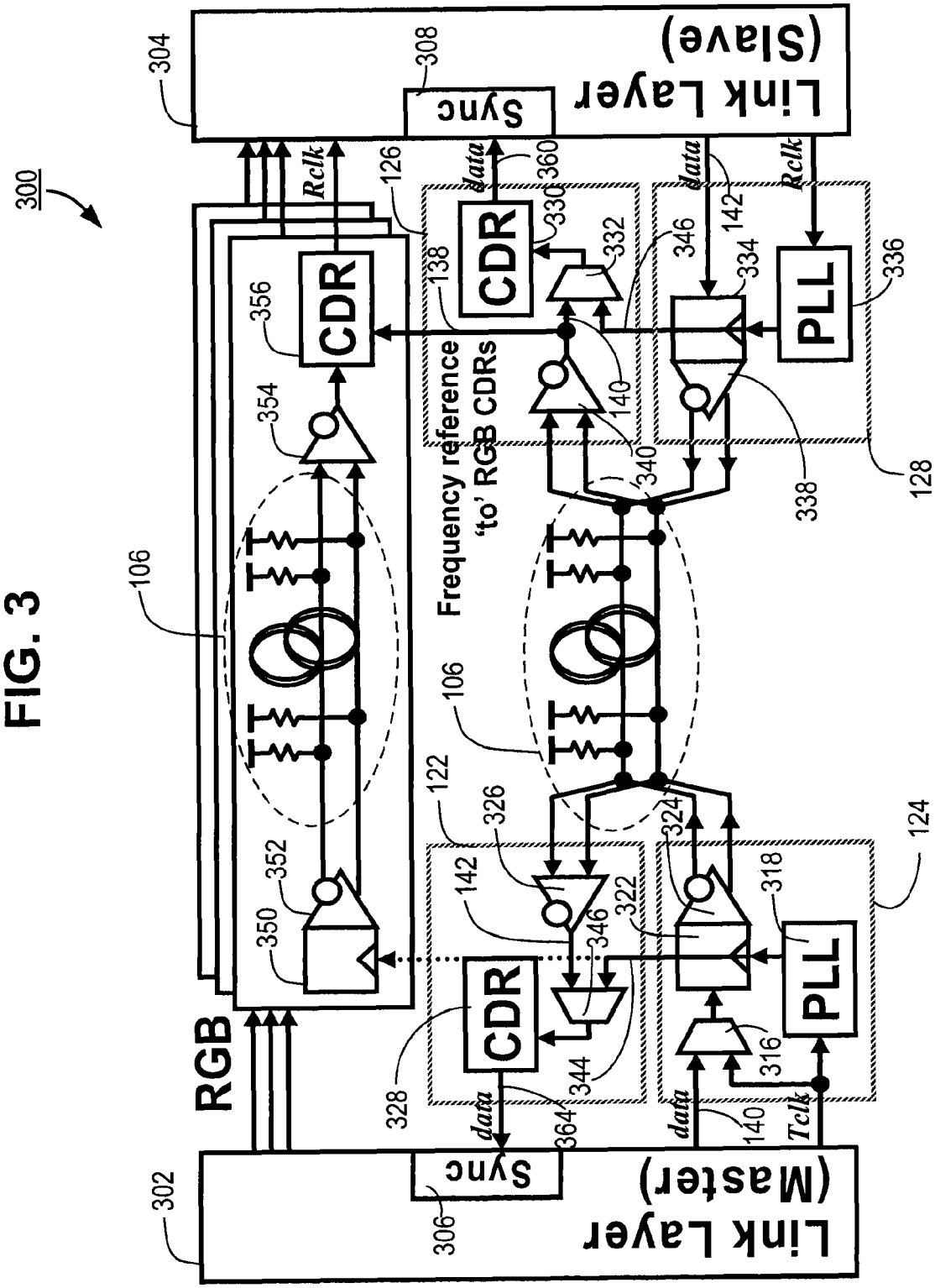
FIG. 3 illustrates the hardware implementation of the bi-directional auxiliary data channel using the clock channel of the digital video interface, according to one embodiment of the present invention.

FIG. 3 illustrates the hardware implementation 300 of the bi-directional auxiliary data channel using the clock channel of the digital video interface, according to one embodiment of the present invention. Note that FIG. 3 only shows components necessary for illustrating the present invention, but the hardware may include other components not shown in FIG. 3 in actual implementations. The hardware 300 includes a master link layer 302 corresponding to the video source 102, a slave link layer 304 corresponding to the video sink 104, wires 106 connecting the master link layer 302 with the slave link layer 304, source side transmitter 124 for the clock channel 120, source side receiver 122 for the clock channel 120, sink side receiver 126 for the clock channel 120, and sink side transmitter 128 for the clock channel 120.

The RGB channels include latches 350 for storing RGB data, output drivers 352 for sending the RGB data via the cable 106, receiver buffers 354 for receiving and storing the received RGB data, and clock data recovery (CDR) circuits 356 for recovering the data and clock signals. RGB data are transmitted over the RGB channels at the frequency of the transmitter clock Tclk as provided by the phase locked loop (PLL) 318 of the source side transmitter 124. Note that, in one embodiment, three identical data channels exist (as shown in the three overlapping blocks in FIG. 3), one each for R, G, B. As will be explained in more detail with reference to FIG. 4, the RGB CDRs 356 acquire a frequency lock during the period when the clock pattern 138 is transmitted over the auxiliary channel implemented by the clock channel 120, then acquire phase lock to the incoming RGB data, and provide a stable receiver clock (Rclk) to the sink side transmitter 128 while it delivers NRZ data from the sink device 104 to the source device 102.

As illustrated above, the source side transmitter 124 is active in mode A and mode B, and includes a phase locked loop (PLL) circuit 318, a multiplexer 316, a latch 322, and an output driver 324. The multiplexer 316 is configured to select the clock signal Tclk 138 in mode A and the data 140 in mode B in response to a selection signal (not shown herein). The PLL 318 synchronizes to the clock signal Tclk and provides the synchronized clock signal to the latch 322, the multiplexer 346 in the source side receiver 122, and the latches 350 in the RGB channels. The latch 322 temporarily stores the output (either Tclk 138 in mode A or data 140 in mode B) of the multiplexer 316, and the output driver 324 transmits the stored clock signal Tclk 138 or data 140 over the cable 106 to the sink side receiver 126.

The sink side receiver 126 is active in mode A and mode B, and includes a receiver buffer 340, a multiplexer 332, and a clock data recovery (CDR) circuit 330. The receiver buffer 340 receives the clock signal Tclk 138 in mode A or the data 140 in mode B as transmitted by the source side transmitter 124. In mode A, the received clock signal Tclk 138 is provided to the CDR circuit 356 of the RGB channels, so that the CDR circuit 356 can be tuned to the proper frequency to recover RGB data correctly. Additional detailed explanation regarding the operation of the CDR circuit 356 is set forth below with reference to FIG. 4. In mode B the multiplexer 332 selects the received data signal 140, but in mode A or mode C the multiplexer 332 selects the output clock 346 of the PLL 336 for idling. In mode B, the CDR circuit 330 recovers NRZ data (data) from the received data signal 140 and provides the recovered NRZ data 360 to the synchronization circuitry 308 of the slave link layer 304. The synchronization circuitry 308 synchronizes the recovered NRZ data 360 with the receiver clock Rclk recovered by the CDR circuit 356 of the RGB channels.

The sink side transmitter 128 is active in mode C, and includes a phase locked loop (PLL) circuit 366, a latch 334, and an output driver 338. The PLL 336 synchronizes to the receiver clock signal Rclk recovered by the CDR circuit 356 of the RGB channels, and provides the synchronized clock signal to the latch 334 and the multiplexer 332 in the sink side receiver 126. The latch 334 temporarily stores the data 142, and the output driver 338 sends the stored data 142 over the cable 106 to the source side receiver 122.

The source side receiver 122 is active in mode C, and includes a receiver buffer 326, a multiplexer 346, and a clock data recovery (CDR) circuit 328. The receiver buffer 326 receives the data 142 in mode C as transmitted by the sink side transmitter 128 and provides it to the multiplexer 346. In mode C the multiplexer 346 selects the received data signal 142, but in mode A or mode B the multiplexer 346 selects the output clock Tclk 344 of the PLL 318 for idling. In mode C, the CDR circuit 328 recovers NRZ data (data) from the received data signal 142 and provides the recovered NRZ data 364 to the synchronization circuitry 306 of the master link layer 302. The synchronization circuitry 306 synchronizes the recovered NRZ data 364 with the transmitter clock Tclk.

As illustrated above, the architecture of each transmitter and receiver is different from conventional implementations, for example in the reference clock configuration. The CDRs in the auxiliary data channel (implemented by the clock channel 120) alternates its reference between system clock (Tclk in Source and Rclk in Sink) and incoming data according to the link operation mode. In modes A and B, the source side CDR 328 is synchronized to the system clock (Tclk) from the PLL 318 while the sink side CDR 330 is synchronized to the incoming data (data 140). In mode C, the source side CDR 328 is synchronized to the incoming data (data 142) while the sink side CDR 330 is synchronized to the system clock (Rclk) from the PLL 336. When the CDRs 328, 330 change their reference, a lock-in period is needed for the CDR loops to settle. The training sequences 172, 182 in the control packets help the CDRs 328, 330 switch their reference quickly and smoothly.

As shown in FIG. 3, the source and sink devices are in a single mesochronous clock system, in which all the building blocks operate in a single frequency domain but may not be aligned in phase. Thus, the phase synchronization blocks 306, 308 are used at the boundary of the two different clock domains, but the cost of such phase synchronization blocks 306, 308 is very low because the data rates are exactly identical. No flow control such as data rate conversion is required. Hence the phase synchronization blocks 306, 308 align the recovered data phase with the system clock phase to maximize setup/hold time margins.

As shown in FIG. 3, the master link layer 302 handles the TDM based half-duplex communication protocol and dynamically allocates the auxiliary channel bandwidth to the upward or downward data stream. Since the uni-directional RGB channels are independent and identical to conventional DVI and HDMI RGB channels, the digital video interface of the present invention can be fully compatible with conventional digital video interfaces by simply disabling the TDM operation in the clock channel 120.

FIG. 4 illustrates the operation of the clock data recovery (CDR) circuits 356 of the RGB channels, according to one embodiment of the present invention. Each of the CDR circuits 356 for the RGB channel includes a data recovery loop 402 and a frequency tracking loop 404. The data recovery loop 402 recovers RGB data from the NRZ RGB data received over the RGB data channel using conventional data recovery circuits and techniques. The frequency tracking loop 404 tunes the center frequency of the CDR circuit 356 to the NRZ data rate of the RGB channel using conventional frequency tracking techniques, and the data recovery loop 402 also regenerates the receiver clock signal Rclk based on the tuned (locked) frequency. However, the data recovery loop 402 and the frequency tracking loop 404 are unique and different from the conventional data recovery loop and the conventional frequency tracking loop in conventional CDR circuits for the RGB channel, in that they are enabled or disabled also in a time-division multiplexed manner.

Specifically, the data recovery loop 402 and the frequency tracking loop 404 are enabled or disabled depending upon the operation modes of the auxiliary data channel implemented by the clock channel 120 and what auxiliary channel data (clock Tclk 138 or data 140) are received over the auxiliary data channel. As shown in FIG. 4 together with reference to FIG. 3, when the receiver buffer 340 receives and outputs the clock signal Tclk 138 over the auxiliary data channel during the V-blank period of the RGB channel, the CDR 356 is in frequency tracking mode. In the frequency tracking mode, the frequency tracking loop 404 is enabled, tuning the center frequency of the CDR circuit 356 to the NRZ data rate of the RGB channel, while the data recovery loop 402 is disabled. Once the frequency tuning is done, the freq_lock signal is asserted from the frequency tracking loop 404 to the data recovery loop 402. This freq_lock signal enables the data recovery loop 402 to recover the RGB data from the NRZ RGB data and regenerate the receiver clock Rclk, making the CDR circuit 356 enter clock/data recovery mode in which the data recovery loop 402 is enabled. Once the CDR 356 enters clock/data recovery mode, the frequency tracking loop 404 is disabled, and is periodically activated only when the clock pattern 138 is present at the auxiliary data channel to check if the CDR 356 is running at the correct frequency. Typically, the V-Blank period is as long as several thousands times of a pixel period, which is long enough for the CDRs 356 to acquire frequency lock and smoothly change its reference to the RGB NRZ data. As long as the NRZ RGB data are present, the CDR circuit 356 can sustain phase lock state by itself using the NRZ RGB data transitions as phase references. Thus, once the CDR 356 enters frequency lock state and switches to clock/data recovery mode, it can provide a stable receiver clock (Rclk) to the slave link layer 304 and the auxiliary data channel without any frequency reference such as Tclk.

Upon reading this disclosure, those of skill in the art will appreciate still additional alternative structural and functional designs for a digital video interface with an auxiliary data channel implemented using the clock channel through the disclosed principles of the present invention. For example, the auxiliary data channel of the present invention can be used with any type of data communication interface and is not limited to communicating digital video data. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangements, operation and details of the method and apparatus of the present invention disclosed herein without departing from the spirit and scope of the invention as defined in the appended claims.

What is claimed is:

1. A digital video interface system for communicating digital video data from a source device to a sink device, the digital video interface system comprising:
   one or more data channels configured to transmit digital video data from the source device to the sink device, the data channels configured to communicate in a plurality of first time slots and a plurality of second time slots different from the first time slots;
   a clock channel configured to operate in the first time slots and the second time slots;
   wherein the clock channel is further configured to transmit a clock signal from the source device to the sink device in the first time slots and configured to transmit additional data in a first direction from the source device to the sink device in the second time slots; and a processor connected to the data channels and the clock channel and configured to control the operation of the data channels and the clock channel;

wherein the clock channel is configured to transmit no data signal during the first time slots and to transmit no clock signal during the second time slots.

2. The digital video interface system of claim 1, wherein the clock channel is also configured to transmit the additional data in a second direction from the sink device to the source device in the second time slots.

3. The digital video interface system of claim 1, wherein the digital video data are transmitted from the source device to the sink device via the data channels in the second time slots.

4. The digital video interface system of claim 1, wherein control data corresponding to the digital video data are transmitted from the source device to the sink device via the data channels in the first time slots.

5. The digital video interface system of claim 4, wherein additional control data are transmitted from the source device to the sink device via the clock channel in the first time slots.

6. The digital video interface system of claim 1, wherein the additional data transmitted via the clock channel comprises audio data.

7. The digital video interface system of claim 2, wherein the additional data transmitted via the clock channel in the first direction from the source device to the sink device include a control packet indicating whether subsequent payload data to be transmitted via the clock channel is in the first direction from the source device to the sink device or in the second direction from the sink device to the source device.

8. The digital video interface system of claim 1, wherein the clock channel is configured to operate in one of a plurality of operation modes, including:

a first mode in which the clock signal is transmitted from the source device to the sink device via the clock channel in the first time slots; and a second mode in which the additional data are transmitted from the source device to the sink device via the clock channel in the second time slots.

9. The digital video interface system of claim 8, wherein the clock channel is also configured to transmit the additional data from the sink device to the source device in the second time slots, and the operation modes further include:

a third mode in which the additional data are transmitted from the sink device to the source device via the clock channel in the second time slots.

10. A digital video interface system for communicating digital video data from a source device to a sink device, the digital video interface system comprising:

one or more data channels configured to transmit digital video data from the source device to the sink device, the data channels configured to communicate in a plurality of first time slots and second time slots;

a clock channel configured to transmit a clock signal from the source device to the sink device in the first time slots and configured to transmit additional data from the source device to the sink device in the second time slots;

wherein the clock channel is configured to operate in one of a plurality of operation modes, including:

a first mode in which the clock signal is transmitted from the source device to the sink device via the clock channel in the first time slots; and a second mode in which the additional data are transmitted from the source device to the sink device via the clock channel in the second time slots; and wherein the digital video interface system further comprises:

a source side transmitter configured to transmit the clock signal in the first mode or the additional data in the second mode to the sink device via the clock channel;

a sink side receiver configured to receive the clock signal in the first mode or the additional data in the second mode from the source device via the clock channel; a sink side transmitter configured to transmit the additional data in the third mode to the source device via the clock channel; and a source side receiver configured to receive the additional data in the third mode from the sink device via the clock channel, and wherein:

the sink side transmitter is disabled in the first mode and the second mode and the source side transmitter is disabled in the third mode.

11. The digital video interface system of claim 10, wherein the sink side receiver includes a clock data recovery circuit configured to recover the additional data received from the source device via the clock channel in the second mode.

12. The digital video interface system of claim 10, wherein each of the data channels comprises a sink side clock data recovery circuit, the sink side clock data recovery circuit including:

a frequency tracking loop for tuning a center frequency of the clock data recovery circuit to a data rate of the digital video data based on the clock signal received from the source device via the clock channel; and a data recovery loop for recovering the digital video data received from the source device via the data channels and a receiver clock signal based on the clock signal received from the source device via the clock channel, and wherein:

the frequency tracking loop is enabled and the data recovery loop is disabled during the first time slots; and the frequency tracking loop is disabled and the data recovery loop is enabled during the second time slots.

13. The digital video interface system of claim 12, wherein the sink side transmitter transmits the additional data from the sink device to the source device via the clock channel synchronized to the recovered receiver clock signal.

14. The digital video interface system of claim 1, wherein the first time slots and the second time slots alternate in time-division multiplexing.

15. The digital video interface system of claim 1, wherein the digital video data include R (red), G (green), and B (blue) digital video data.

16. A method for communicating digital video data from a source device to a sink device, the method comprising:

transmitting digital video data from the source device to the sink device via one or more data channels, the data channels configured to communicate in a plurality of first time slots and a plurality of second time slots different from the first time slots; and transmitting a clock signal, and no data signal, from the source device to the sink device via a clock channel in the first time slots and transmitting additional data, and no clock signal, in a first direction from the source device to the sink device via the clock channel in the second time slots, the clock channel configured to operate in the first time slots and the second time slots.

17. The method of claim 16, further comprising transmitting the additional data in a second direction from the sink device to the source device via the clock channel in the second time slots.

18. The method of claim 16, wherein the digital video data is transmitted from the source device to the sink device via the data channels in the second time slots.

19. The method of claim 16, further comprising transmitting control data corresponding to the digital video data from the source device to the sink device via the data channels in the first time slots.

20. The method of claim 19, further comprising transmitting additional control data from the source device to the sink device via the clock channel in the first time slots.

21. The method of claim 16, wherein the additional data transmitted via the clock channel comprise audio data.

22. The method of claim 16, wherein the additional data transmitted via the clock channel in the first direction from the source device to the sink device include a control packet indicating whether subsequent payload data to be transmitted via the clock channel is in the first direction from the source device to the sink device or in the second direction from the sink device to the source device.

23. The method of claim 16, wherein the clock channel is configured to operate in one of a plurality of operation modes, including:
   a first mode in which the clock signal is transmitted from the source device to the sink device via the clock channel in the first time slots; and
   a second mode in which the additional data are transmitted from the source device to the sink device via the clock channel in the second time slots.

24. The method of claim 23, further comprising transmitting the additional data from the sink device to the source device via the clock channel in the second time slots, and wherein the clock channel is also configured to operate in a third mode in which the additional data are transmitted from the sink device to the source device via the clock channel in the second time slots.

25. A system for communicating digital data from a source device to a sink device, the system comprising:
   one or more data channels configured to transmit digital data from the source device to the sink device, the data channels configured to communicate in a plurality of first time slots and a plurality of second time slots different from the first time slots; and
   a clock channel configured to operate in the first time slots and the second time slots; and
   a processor connected to the data channels and the clock channel and configured to control the operation of the data channels and the clock channel;
   wherein the clock channel is further configured to transmit a clock signal from the source device to the sink device in the first time slots and configured to transmit additional data from the source device to the sink device in the second time slots; and
   wherein the clock channel is configured to transmit no data signal during the first time slots and to transmit no clock signal during the second time slots.

26. The system of claim 25, wherein the clock channel is also configured to transmit the additional data in a second direction from the sink device to the source device in the second time slots.

27. The system of claim 25, wherein the digital data are transmitted from the source device to the sink device via the data channels in the second time slots.

28. The system of claim 25, wherein control data corresponding to the digital data are transmitted from the source device to the sink device via the data channels in the first time slots.

29. The system of claim 28, wherein additional control data are transmitted from the source device to the sink device via the clock channel in the first time slots.

30. The system of claim 26, wherein the additional data transmitted via the clock channel in the first direction from the source device to the sink device include a control packet indicating whether subsequent payload data to be transmitted via the clock channel is in the first direction from the source device to the sink device or in the second direction from the sink device to the source device.

31. The system of claim 25, wherein the clock channel is configured to operate in one of a plurality of operation modes, including: a first mode in which the clock signal is transmitted from the source device to the sink device via the clock channel in the first time slots; and a second mode in which the additional data are transmitted from the source device to the sink device via the clock channel in the second time slots.

32. The system of claim 31, wherein the clock channel is also configured to transmit the additional data from the sink device to the source device in the second time slots, and the operation modes further include: a third mode in which the additional data are transmitted from the sink device to the source device via the clock channel in the second time slots.

* * * * *